Dec. 15, 1942.  E. A. WERT  2,305,048
INDICATING HANGER FOR PIPE LINES OR THE LIKE
Filed Aug. 5, 1941  3 Sheets-Sheet 1

INVENTOR
Edwin A. Wert
by his attorneys
Stebbins and Blenko

Dec. 15, 1942.  E. A. WERT  2,305,048
INDICATING HANGER FOR PIPE LINES OR THE LIKE
Filed Aug. 5, 1941  3 Sheets-Sheet 2

INVENTOR
Edwin A. Wert
by his attorneys
Stebbins and Blenko

Dec. 15, 1942.  E. A. WERT  2,305,048
INDICATING HANGER FOR PIPE LINES OR THE LIKE
Filed Aug. 5, 1941  3 Sheets-Sheet 3

INVENTOR
Edwin A. Wert
by his attorneys
Stebbins and
Blenko

Patented Dec. 15, 1942

2,305,048

UNITED STATES PATENT OFFICE 2,305,048

INDICATING HANGER FOR PIPE LINES OR THE LIKE

Edwin A. Wert, Detroit, Mich., assignor to Blaw-Knox Company, Pittsburgh, Pa., a corporation of New Jersey Application August 5, 1941, Serial No. 405,519

3 Claims. (Cl. 248—59)

This invention relates broadly to a suspension for pipe lines and, in particular, to means particularly suited for supporting pipe installations of large size which are subject to considerable variation in temperatures, e. g., the main steam lines of power plants, and indicating changes in the normal position thereof so that dangerous conditions resulting from repeated heatings and coolings may be foreseen.

Wherever pipe lines are subjected to a wide range of temperature, as in steam power plants where there may be a variation of as much as 1000 degrees between the temperature of the pipe line when cold and its temperature when carrying superheated steam, the expansion of the pipe when heated and the contraction when cooled introduce conditions in the supporting of said pipe lines and in their maintenance which increase in importance as the pipe sizes and the temperature differences increase, and are of major importance in the modern steam power station.

A straight wrought steel pipe 100 feet long on being heated from a temperature of minus 20° F. to a temperature of 900° F. would elongate about 8.3″. It is obvious, therefore, that a straight steam pipe cannot be used to connect a boiler which is fixed in position with an engine which is likewise fixed in position and is some distance away. There must be means for permitting the elongation of the pipe to be taken up in bends and it is usual to provide elbows, bends, or loops in steam pipe systems to allow expansion without displacement of the terminals which must be fixed. Consequently, in designing the piping system for a powerhouse it is necessary so to lay out the pipe lines as to permit the necessary bending and the displacement of the pipe when heated and cooled. In the case of stations developing large amounts of power, the steam engines or turbines are of large size and the pipes conveying steam to them are necessarily large, and it is obvious that the greater the diameter of the pipe, the greater the resistance it will offer to bending and the greater the care and attention which must be given in the design to allowing for the deflections which will take place and providing supports which will accommodate them. It has been proposed heretofore to support a pipe line upon hangers provided with springs to permit some upward or downward movement of the pipe at the point of suspension and to provide vertical adjustment within the hangers to distribute the vertical load. Such expedients, however, afford no indication of a progressive change in the condition of a portion of a pipe line, as a result of repeated heating and cooling cycles.

I have invented a novel suspension mechanism particularly suited for supporting pipe lines subject to considerable expansion and contraction, whereby the pipe is free to move without restraint in certain directions in predetermined planes, through substantial distances. I also provide means whereby deviations from the original position of a pipe line after repeated heating and cooling cycles may be easily detected. In a preferred embodiment of the invention, I provide a spring suspension with means for indicating the degree of compression or elongation thereof. I also provide means for supporting the spring suspension for movement along the line of the pipe and also at right angles thereto. By this arrangement, the suspension exerts force on the pipe line exclusively in the vertical direction, leaving it free to move in all directions in a horizontal plane. I also provide means for indicating the movement of support of the spring suspension in a horizontal plane. By virtue of the spring suspension, furthermore, vertical movement of the pipe at the point of support is permitted, downward movement being opposed by the force of the spring. The invention thus accomplishes two important objects, viz., to permit greater displacements of the pipe, either longitudinally or laterally than hangers known heretofore; and to provide indicating means whereby permanent deformation of various portions of the line may be detected in time to adopt corrective measures before dangerous conditions develop.

The invention may be more fully comprehended by consideration of the accompanying drawings illustrating several embodiments. In the drawings, Figure 1 is a perspective view of a long steam pipe having bends to permit expansion and contraction;

Figure 6 is a side elevation of a modified form;

Figure 8 is an elevation of a further modified form of suspension; and

Figure 9 is a sectional view taken substantially along the plane of line IX—IX of Figure 8.

Figure 1:
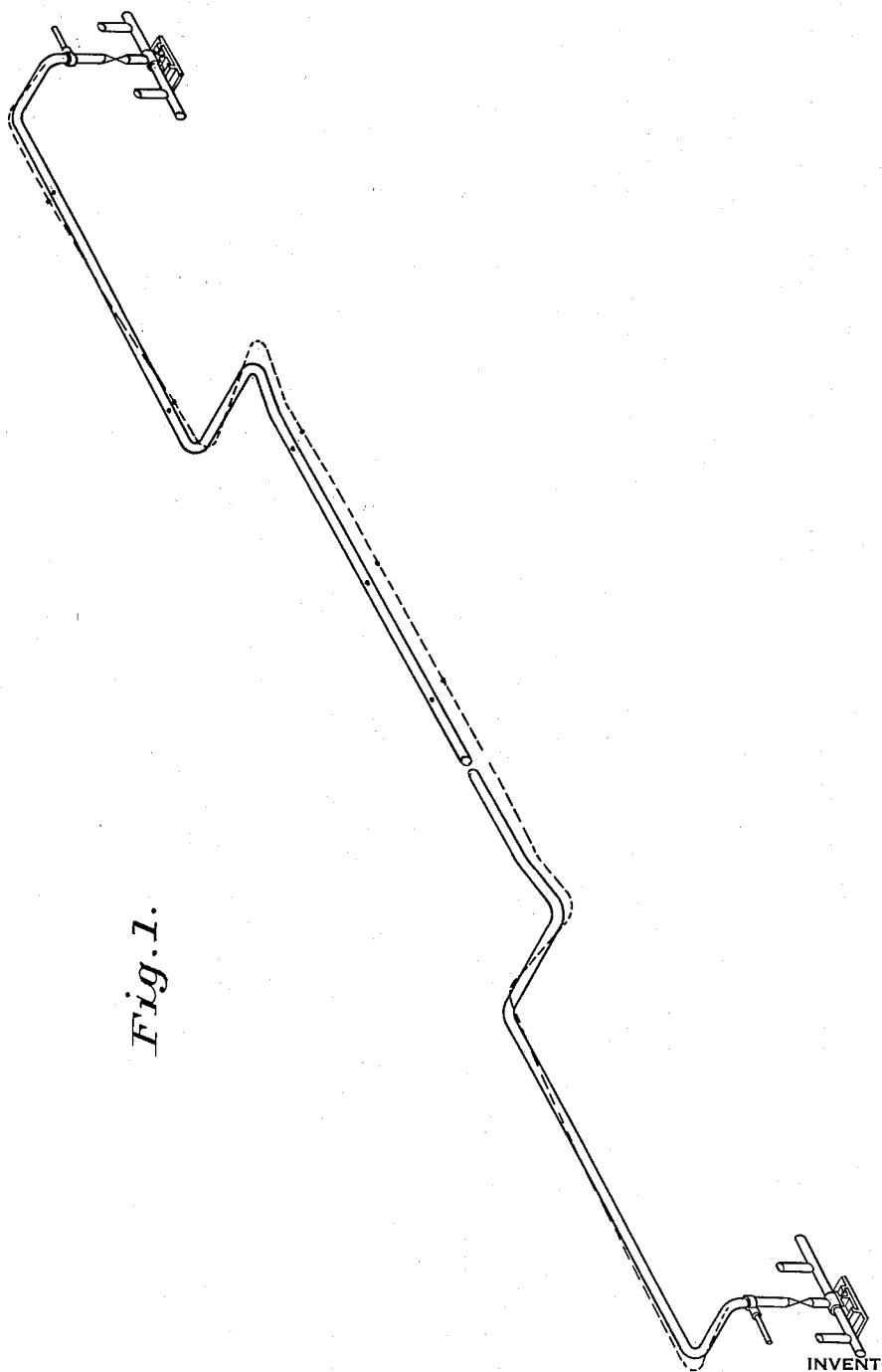

By way of practical illustration of the nature of deflections in a steam pipe in a power station, Figure 1 shows an actual installation diagrammatically. It indicates quantitatively the deflections in a pipe line connecting two stationary points 176 feet apart, the pipe line being supported near the ceiling in a power house in horizontal position, and containing three approximately straight runs with six bends and four shorter runs approximately at right angles to the three longer runs. The position of this pipe line when cold is indicated in full lines and the position of its center line when hot is indicated in dash lines. Figure 1 shows that in the middle or longer run, the pipe line is deflected laterally a considerable distance and that in general, owing to the expansion of the longer runs, the elbows or bends are all made sharper when the pipe is hot. In the actual installation, the pipe line was restrained by anchors at the two ends only and supported so as to be free to move in a horizontal plane at all intermediate points. It could, of course, have been restrained from horizontal motion in any given direction at an intermediate point, in which case the positions which other parts of the line would occupy when expanded would be different from those shown in the drawing. In any actual installation, it is necessary to secure the pipe in such a manner that it will be free to expand as much as necessary without coming into contact with any fixed part of the building walls or columns. It is also obvious, of course, that the pipe when originally installed will not be heated above the temperature of the room where the work is done and the layout must provide for its support in cold position, and also make proper provision for deflections which take place on expansion.

It has previously been proposed to support a pipe line in such a manner that it may expand and contract and undergo deflection in that process, and in many instances the bending which takes place owing to such expansion and contraction, and the displacement of the pipe owing to the same cause, are not so great as to make it necessary to allow for considerable deflections or to take into account the effect which such bending has upon the strength of the pipe itself. Where it is not necessary to allow for very great deflections or to ascertain the amount of bending which takes place, the hanger described in my Patent 2,159,870, issued May 23, 1939, is suitable, permitting a reasonable amount of swing in horizontal plane and a reasonable amount of deflection in the vertical plane, the vertical support being adjustable. However, where the lateral movements of the pipe are considerable and where it is desirable to keep a record of changes in position of the pipe in service, the present invention is to be preferred.

The expansion of the pipe due to elevation of its temperature requires that provision be made for bending between any two fixed points and the support for the pipe must allow for this. However, repeated bending in one direction when the pipe length is extended, on account of elevated temperature, and bending in the opposite direction when the pipe length is cooled, even though the deflection be not greater in any instance than that which would lie within the supposed elastic limit of the material at the temperatures under consideration, do, in the course of time, result in permanent change in the shape of the pipe line. I have found that, if careful measurements are made of the exact positions of a number of points on the pipe line when first installed and the temperature is then raised by the application of hot steam, an accurate determination of the positions of the same points on the pipe line shows that if the aforesaid points be at or very close to the points of vertical support, there is a definite movement of each said point in the horizontal plane consequent upon the application of heat and the resulting expansion of the line. Similarly, after the pipe has been heated, and the steam is turned off and the pipe allowed to cool, the position of each of the aforesaid points returns almost exactly to the same position as it occupied before. But I have also found that after a pipe has been heated and cooled in this manner a considerable number of times, there is a permanent deflection or permanent set in the bending of the pipe so that the pipe neither returns to exactly the original cold position nor expands upon heating to exactly the first hot position. Any such permanent deformation of the pipe from that contemplated in the original design weakens the pipe at the points where deformation occurs and may eventually bring portions of the pipe line into contact with walls, columns, or permanent supports so as to exert pressure thereon and to restrain the normal expansion and contraction of the pipe contemplated in the original design. Any general shifting of any point on the pipe from its original position—either hot or cold—will indicate by its direction and amount, the point in the pipe line or the part thereof which has undergone more permanent deflection than others and which should receive attention and readjustment in order that the position of the line may be kept normal, or which possibly may be stressed beyond its elastic limit with the successive expansions and contractions and require either reinforcement or replacement to prevent endangering the line.

The present invention has two objects; (1) to allow for a greater amount of displacement of the pipe in any direction in a horizontal plane than is allowed for in the applicant's patented hanger previously referred to, and (2) to provide indicators by which not only may the normal expansion and contraction of the pipe line when new be ascertained at several points of support, but by which also any permanent deflection from the original position of given points on a pipe line may be observed from time to time and the condition of the line thus be kept track of for the purpose of insuring safety and proper maintenance.

Figure 2:
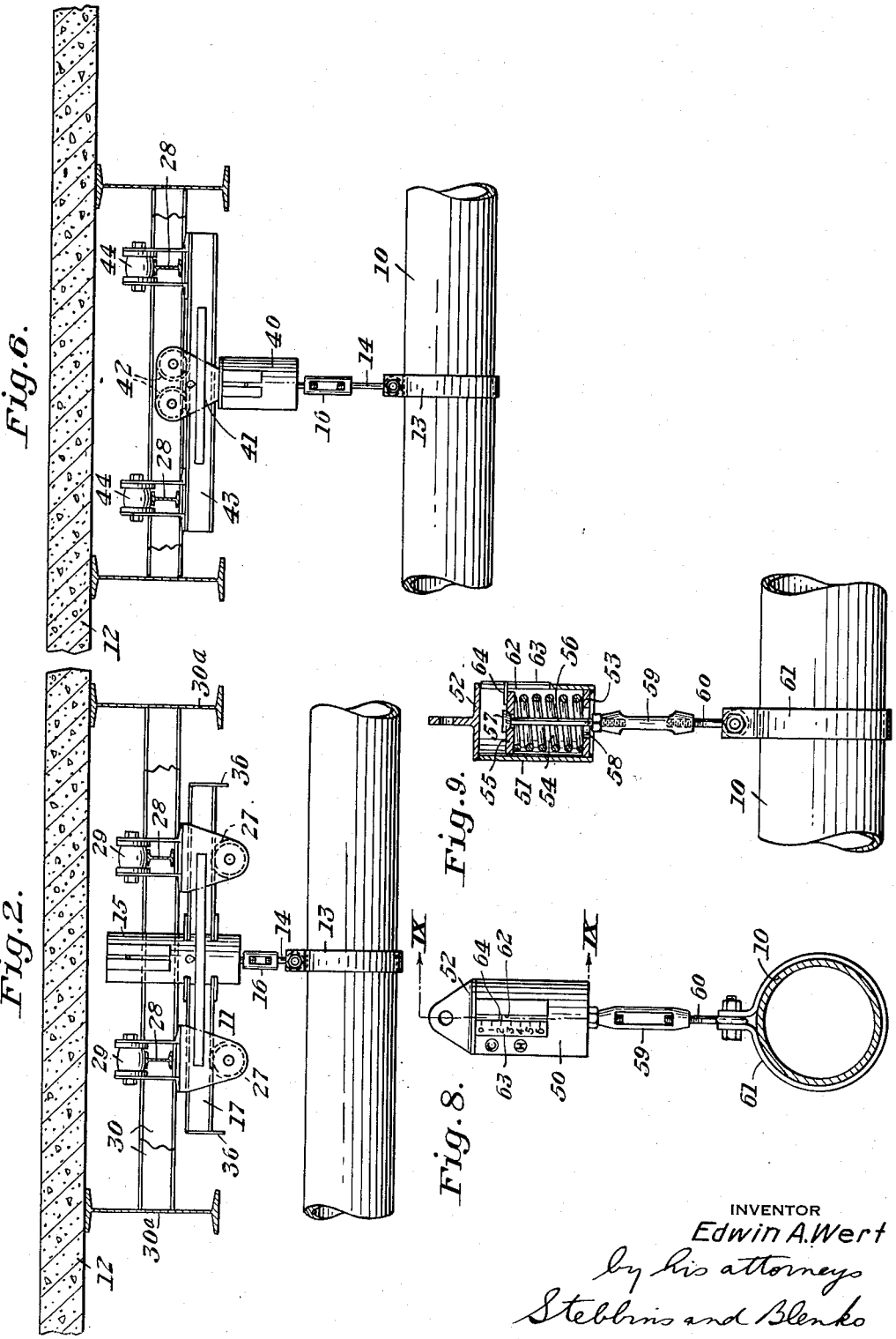
Figure 2 is a side elevation of one embodiment including all features of the invention, adapted to consume as little head room as possible with parts in section.
Figure 3:
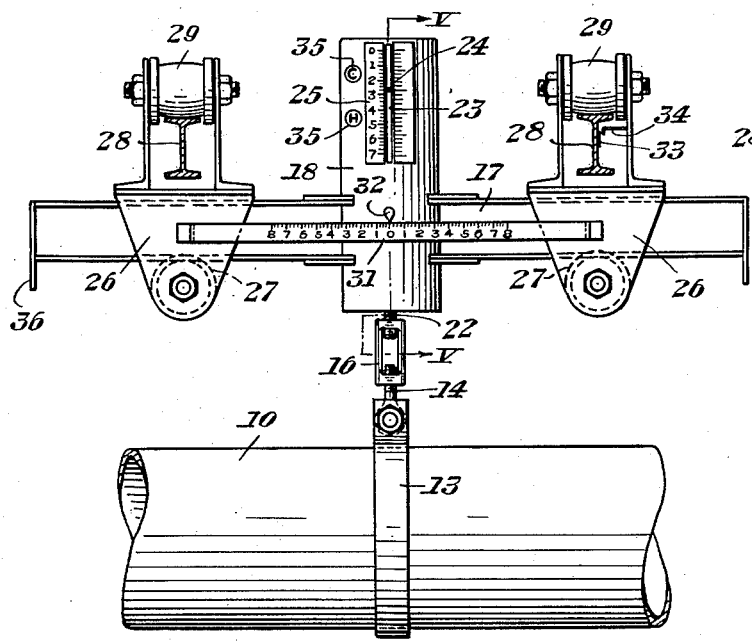
Figure 3 shows a portion of Figure 2 to enlarged scale.
Figure 4:
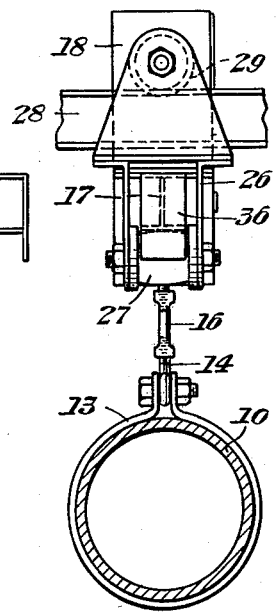
Figure 4 is an end elevation of the structure shown in Figure 3 with the pipe in section.
Figure 5:
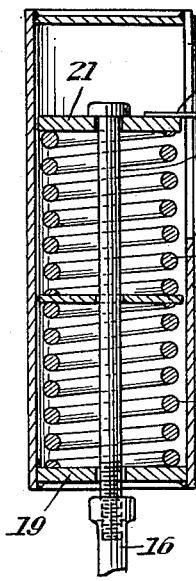
Figure 5 is a vertical section through the spring suspension member forming part of the structures illustrated in Figures 2 through 4.

Referring now more particularly to Figures 2, 3 and 4, a pipe line 10 such as the main steam line of a power plant is supported at several points along its length by the device of my invention indicated generally at 11. Figure 2 illustrates a horizontal portion of a pipe line which is supported adjacent the ceiling 12 of the engine room, boiler room, or the like. The invention is applicable, however, to the support of vertical portions of a pipe line as will be explained later.

The pipe line 10 is embraced by a collar 13 secured to a hanger rod 14 extending below a spring suspension 15. A turn buckle 16 is disposed between the spring suspension 15 and the hanger rod 14. The suspension 15 is supported on a beam 17 which may conveniently be composed of suitable lengths of T-beam welded endwise to the suspension 15. The latter, as shown in Figure 6, comprises a tubular housing 18 having a bearing plate 19 welded in the lower end thereof. Compression springs 20 are disposed in the housing 18. A bearing plate 21 resting on the upper spring 20 supports a rod 22 threaded into the turn buckle 16. The housing 18 has a vertical slot 23 extending longitudinally for a portion of its length. A pointer 24 on the bearing plate 21 is visible through the slot 23 and cooperates with a graduated scale 25 on the exterior of the housing 18.

The beam 17 is supported on trolleys 26 provided with rollers 27 whereby the beam is movable longitudinally. The trolleys are supported on intermediate or cross beams 28 and are provided with rollers 29 whereby they may move along these beams. As shown in Figure 2, the beams 28 extend between the beams 30 secured to the principal ceiling beams 30A.

A scale 31 extends between the trolleys 26 and is secured thereto. A pointer 32 fixed on the housing 18 of the suspension 15 cooperates with this scale. A scale 33 is secured to one of the beams 28 and a pointer 34 fixed to the trolley 26 supported thereby cooperates with this scale.

As clearly shown in the drawings, the suspension 15 is movable longitudinally of the pipe 10 because of the fact that the beam 17 may shift on the rollers 27. Similarly, the trolleys 26 may shift on the beams 28, thereby permitting lateral movement of the pipe line. It is thus evident that the point on the pipe engaged by the collar 13 may move freely in any direction in a horizontal plane, within the limits for which the device is designed, without restraint. The only force exerted on the pipe by the suspension device is that resulting from the compression of the springs 20 which carry the weight of a portion of the pipe line but at the same time permit vertical movement up or down, downward movement being restrained by the force of the spring.

The several scales and pointers permit a ready visual determination of changes in the position of the point of the pipe line supported by the collar 13. To this end, I provide markers such as buttons 35 which may be removably positioned adjacent the various scales when the line is first installed, to designate the position of the point of support in the three planes of reference, the buttons being marked "C" and "H" to designate the positions of the pointers under cold and hot conditions respectively. Any departure from these initial pointer indications, under corresponding hot and cold conditions of the line, reveals any permanent deformation caused by creep or growth incident to repeated heating and cooling cycles.

The portion of the load represented by the weight of pipe line which is carried by any individual suspension is adjustable by means of the turn buckle 16. End plates 36 welded to the beam 17 prevent excessive longitudinal movement thereof.

Figure 7:
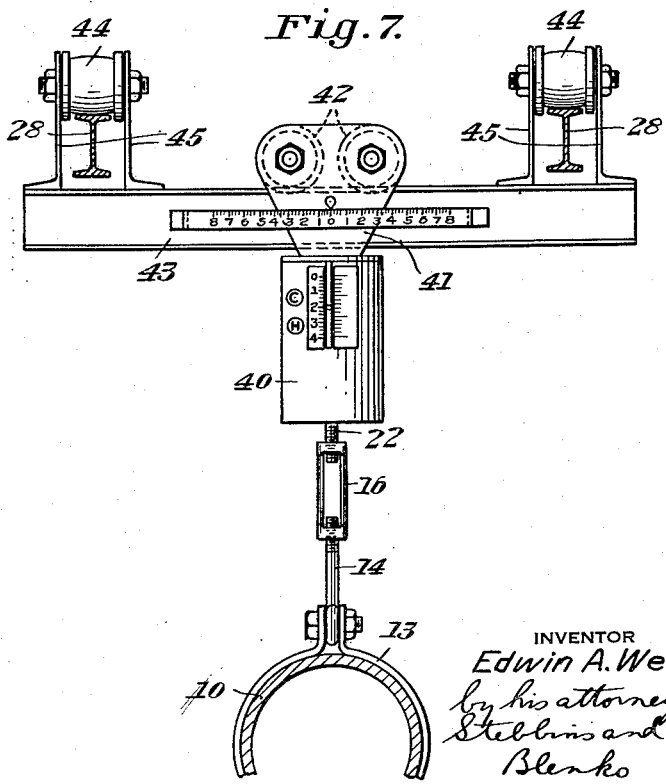
Figure 7 is an enlarged side elevation showing a part only of Figure 6.

Figures 6 and 7 illustrate a modified support which is generally similar to that already described except for the mounting of the spring suspension 15. In the construction shown in Figures 2 through 5, the spring suspension 15 extends partly above and partly below the beam 17. This arrangement is desirable where head room is limited and it is desired to support the pipe line as near as possible to the ceiling. In cases where there is ample head room, the construction shown in Figures 6 and 7 may be desired.

In this form of the invention, a spring suspension 40 generally similar to that shown at 15 is supported on a trolley 41 having rollers 42 adapted to travel along a beam 43. The beam 43 is supported for transverse shifting movement on rollers 44 journaled in bearing brackets 45 secured to the beam 43 adjacent the ends thereof. The rollers 42 roll on beams 28 corresponding to those similarly designated in Figures 2 and 3. It will be apparent that the device shown in Figures 6 and 7 differs from that previously described only in the manner of mounting the spring suspension on its supporting beam and the fact that the supporting beam of the modified form is fixed, while in the form first described it moves with the suspension. The arrangement of the scales, pointers, etc., is practically the same in both forms of the invention.

A further modification of the invention shown in Figures 8 and 9 is useful for installations where the longitudinal or lateral movement of the pipe is not very great. In this modification, a spring suspension 50 comprises a tubular housing 51 having a hanger plate 52 welded to one end thereof and a bearing plate 53 welded in the other end. A spring 54 in the housing rests on the bearing plate 53 and supports a bearing plate 55. A hanger rod 56 has a hemispherical head 57 engaging a similarly shaped seat in the plate 55. The plate 53 has a hole 58 therein large enough to permit lateral swinging of the rod 56. The hanger is completed by the turn buckle 59, a rod 60 and a collar 61. The housing 51 is slotted as at 62 and is provided with a scale 63. A pointer 64 on the bearing plate 55 is visible through the slot and cooperates with the scale 63.

The hanger shown in Figures 8 and 9 is adapted to be rigidly anchored to a supporting beam or the like and permits a vertical movement of the pipe as well as a limited lateral or longitudinal movement.

As previously mentioned, the invention is adapted to support vertical portions of a pipe line as well as horizontal portions, the only modification necessary being the provision of means on the pipe adapted to cooperate with the hanger rod. It is usually preferable to provide a hanger on each side of a vertical line of pipe at a given point. Both hangers may be supported on the same cross beams such as those shown at 28.

It will be apparent from the foregoing description and explanation that the invention provides a supporting mechanism for pipe lines which permits a wide range of movement of the pipe. The provision of indicator scales, furthermore, make it possible to determine at a glance whether a pipe is in its normal position for a given condition, i. e., hot or cold, and if not the trend and extent of the deviation from normal. The information thus obtained makes it possible to provide for necessary readjustment or replacement of pipe-line sections before the movement thereof proceeds far enough to result in objectionable contact between the pipe line and the building frame, walls, etc.

Although I have illustrated and described a preferred embodiment and certain modifications of the invention, it may also be embodied in other forms within the scope of the following claims and without departing from the spirit of the invention.

I claim:

1. A pipe line suspension device comprising a depending hanger adapted to be secured to a pipe line, a beam on which said hanger is mounted, and trolleys supporting said beam for longitudinal movement.

2. A pipe line suspension device comprising a depending hanger adapted to be secured to a pipe line, a beam on which said hanger is mounted, trolleys supporting said beam for longitudinal movement and beams supporting said trolleys, the trolleys being movable along said last-mentioned beams, the latter being at right angles to said first-mentioned beam.

3. A pipe line suspension comprising a pipe hanger, a beam supporting the hanger, roller means engaging said beam whereby said hanger may move in the direction of the length of the beam, and a pair of trolleys supporting said beam, said trolleys traveling on tracks at right angles to said beam.

EDWIN A. WERT.